(12) United States Patent
Hassan (10) Patent No.: US 6,508,936 B1
(45) Date of Patent: *Jan. 21, 2003

(54) PROCESS FOR DESALINATION OF SALINE WATER, ESPECIALLY WATER, HAVING INCREASED PRODUCT YIELD AND QUALITY

(75) Inventor: Ata M. Hassan, San Diego, CA (US)

(73) Assignee: Saline Water Conversion Corporation, Al-Jubail (SA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,827

(22) Filed: Oct. 1, 1997

(51) Int. Cl.[7] ............................................... B01D 61/00
(52) U.S. Cl. ..................... 210/652; 210/641; 210/180; 210/175; 203/12
(58) Field of Search ................................ 210/652, 641, 210/180, 175; 203/12

(56) References Cited

U.S. PATENT DOCUMENTS

| | | | | |
|---|---|---|---|---|
| 4,036,749 A | * | 7/1977 | Anderson | 210/652 |
| 4,083,781 A | * | 4/1978 | Conger | 210/652 |
| 4,156,645 A | * | 5/1979 | Bray | |
| 4,944,882 A | * | 7/1990 | Ray et al. | |
| 5,238,574 A | * | 8/1993 | Kawahima et al. | |
| 5,458,781 A | * | 10/1995 | Lin | 210/652 |
| 5,587,083 A | * | 12/1996 | Twardowski | 210/652 |
| 5,670,053 A | * | 9/1997 | Collentro et al. | 210/652 |
| 5,695,643 A | * | 12/1997 | Brandt et al. | 210/652 |
| 6,190,556 B1 | * | 2/2001 | Uhlinger | |

FOREIGN PATENT DOCUMENTS

| | | |
|---|---|---|
| EP | 0 463 605 A1 | 1/1992 |
| JP | 61-200810 | 2/1985 |
| JP | 08-206460 | 8/1996 |
| JP | 09-141260 | 6/1997 |
| WO | WO97/05945 | 2/1997 |

OTHER PUBLICATIONS

K. Scott, Handbook of Industrial Membranes, pp. 34–39.*
K. Scott, Handbook of Industrial Membranes, 1995, p. 46.*
Bequet, S., et al., New composite membrane of water softening, Desalination, 131:299–305 (Dec. 20, 2000).

(List continued on next page.)

Primary Examiner—Ana Fortuna
(74) Attorney, Agent, or Firm—Brown Martin Haller & McClain LLP (57) ABSTRACT

A desalination process is disclosed which combining two or more substantially different water treatment processes in a unique manner to desalinate saline water, especially sea water, to produce a high yield of high quality fresh water, including potable water, at an energy consumption equivalent to or less than much less efficient prior art desalination processes. In this process a nanofiltration step is synergistically combined with at least one of sea water reverse osmosis, multistage flash distillation. multieffect distillation of vapor compression distillation to provide an integrated desalination system by which sea water can be efficiently and economically converted to high quality potable water in yields which are at least 70%–80% greater than the yields available from the prior art processes. Typically a process of this invention using the nanofiltration initial step will produce, with respect to sea water feed properties, calcium, magnesium, sulfate and bicarbonate ion content reductions of 63%–94%, pH decreases of about 0.4–0.5 units and total dissolved solids content reductions of 35%–50%.

15 Claims, 9 Drawing Sheets

OTHER PUBLICATIONS

Bisconer, Inge, Explore the capabilities of nano– and ultra-filtration, Water Technology, 2 pages– page numbers not stated (Mar. 1998).

Author Unknown, Kodak, Nanofiltration for Professional Motion Imaging, On–Line Technical Support paper, pp. 1–6 (1994–2000).

Linde, K., et al., Nanofiltration of salt solutions and landfill leachate, Desalination, 131:Abstract (1995).

Nicolaisen, Bjarne, Nanofiltration– Where Does it Belong in the Larger Picture?, pp. 1–7, Product brochure for "Desal–5" membrane products, Desalination Systems, Inc. (Dec. 1994).

Ayyash et al., *Desalination*, (1994) pp. 215–224, vol. 96.

Bergman, *Desalination*, (1995) pp. 11–24, vol. 102.

Boonthanon et al., *J. Water SRT–Aqua*, (1991) pp. 103–109, vol. 40(2).

Broom et al., *J. Membrane Sci.*, (1994) pp. 219–230, vol. 87.

De Maio et al., *Desalination*, (1983) pp. 197–207, vol. 45.

Duran et al., *Desalination*, (1995), pp. 27–34, vol. 102.

Dykes et al., *J. Amer. Water Wks. Assoc.*, (1989) pp. 43–46, vol. 81.

Enoch et al., *J. Membrane Sci.*, (1994) pp. 191–198, vol. 87.

Ericsson et al., *Desalination*, (1994) pp. 3–16, vol. 98.

Fu et al., *Desalination*, (1995) pp. 47–56, vol. 102.

Ikeda et al., *Desalination*, (1988) pp. 109–119, vol. 68.

Langelier et al., *Ind & Eng. Chem.*, (1950) pp. 126–130, vol. 42(1).

Linde et al., *Desalination*, (1995) pp. 223–232, vol. 103.

Nauleau et al., *Water Supply*, (1993) pp. 177–187, vol. 11(3/4).

Rautenbach et al., *Desalination*, (1990) pps. 73–84, vol. 77.

Schwartz et al., *Desalination*, (1995) pps. 63–75, vol. 102.

Weston, *Filtration & Separation*, (Jun. 1997) p. 451.

*Proceedings of IDA World Congress*, (Nov. 18–24, 1995) vol. I–IV, Abu Dhabi A) Al–Badawi et al., "Operation and Analysis of Jeddah I—Phase II Plant", pp. 41–53.

B) Al–Soft et al., "Heat Transfer Measurement as a Criterion for Performance evaluation of Scale Inhibition in MSF Plants", pp. 191–203.

C) Ebrahim et al., "Pretreatment for Seawater Reverse Osmosis Plants Using Microfiltration Systems", pp. 229–239.

D) Hassan et al., "Optimization of SWRO Pretreatment—Part I: SDI Measurement", pp. 115–125.

E) Hassan et al., "Optimization of SWRO Pretreatment—Part II: SWRO Membranes Evaluation and Their Use in Evaluation SWRO Pretreatment", pp. 131–141.

F) Khordagui, "Fate and Control of Chemical Warfare Agents in the Desalination Industry of the Arabian Gulf", pp. 331–332.

G) Rajeswari, "The Plight of Potable and Usable Water—Pollution, Health Hazards, Environmental Threats and Abatement Methods", p. 330.

H) Rautenbach et al., "High Pressure Reverse Osmosis and Nanofiltration, a 'Zero Discharge' Process Combination for the Treatment of Waste Water with Severe Fouling/Scaling Potential", p. 329.

I) Taniguchi et al., "Pretreatment with Membranes for Seawater Reverse Osmosis Process", pp. 135–146.

D.L. Comstock, "Desal–5 Membrane for Water Softening, "*Desalination*, vol. 76. pp. 61–72 (1989).

I.S. Al–Mutaz et al., "Optimum Design for a Hybrid Desalting Plant," *Desalination*, vol. 76, pp. 177–187 (1989).

L.P. Raman et al., "Consider Nanofiltration for Membrane Separations," *Chem. Eng. Prog.*, vol. 90, pp. 68–74 (Mar., 1994).

A.M. Hassan et al., "A New Approach to Membrane and Thermal Seawater Desalination Processes Using Nanofiltration Membranes (Part 1),"0 *Desalination*, vol. 118, pp. 35–51 (1998).

M.A.K. Al–Sofi et al., "Nanofiltration as a Means of Achieving Higher TBT of $\geq 120°C$. in MSF,"*Desalination*, vol. 118, pp. 123–129 (1998).

* cited by examiner

PROCESS FOR DESALINATION OF SALINE WATER, ESPECIALLY WATER, HAVING INCREASED PRODUCT YIELD AND QUALITY

BACKGROUND OF THE INVENTION

1. Field of the Invention

The invention herein relates to desalination of saline water. More particularly it relates to processes for desalination of desalination, especially of sea water, for production of fresh water.

2. Description of the Prior Art

Many countries have considered desalination of saline water, especially sea water, as a source of fresh water for their arid coastal regions or for regions where water sources are brackish or have excessive hardness. Typical areas where desalination has been considered or is in use include southern California in the United States, Saudi Arabia and other Middle Eastern countries, Mediterranean countries, Mexico and the Pacific coast countries of South America. Similarly, islands with limited fresh water supplies, such as Malta, the Canary Islands and the Caribbean islands, also use or have considered desalination of sea water as a fresh water source.

Desalination process in the past, however, have had high energy requirements per unit of desalinated water product and have operated at relatively low yields, typically 35% or less based on feed. They have therefore been economical only for those locations where fresh water shortages are acute and energy costs are low. While desalination plants have also been used in other areas, those uses have generally been in times of drought or as stand-by or supplemental sources of fresh water when other sources are temporarily limited or unavailable, since in most such locations current desalination processes cannot compete effectively with other sources of fresh water, such as overland pipelines or aqueducts from distant rivers and reservoirs.

However, because there is a vast volume of water present in the oceans and seas, and because direct sources of fresh water (such as inland rivers, lakes and underground aquifers) are becoming depleted, contaminated, or reaching capacity limits, there is a extensive research underway through the world for an economical process for desalination of saline water, and especially of sea water.

Desalination of sea water must take into account important properties of the sea water: turbidity, hardness and salinity (ionic content and total dissolved solids [TDS]) and the presence of suspended particulates and microorganisms. These properties place limits of 30%–35% on the amount of fresh water yield that can be expected from prior art desalination process as used or proposed. Reference is made in this application to "saline" water, which includes sea water from seas and oceans and water from various salt lakes and ponds, brackish water sources, brines, and other surface and subterranean sources of water having ionic contents which classify them as "saline." This can generally be considered to be water with a salt content of $\geq 1000$ parts per million (ppm); Kirk-Othmer (ed.), CONCISE ENCYCLOPEDIA OF CHEMICAL TECHNOLOGY, 1252–1254 (1985). Since of course sea water has the greatest potential as a source of potable water (i.e., generally considered to be water with a salt content of $\leq 500$ ppm [ibid.]), this application will focus on sea water desalination. However, it will be understood that all sources of saline water are to be considered to be within the present invention, and that focus on sea water is for brevity and not to be considered to be limiting.

Multistage flash distillation (MSFD) is the major desalination process used worldwide. Alone, it accounts for about 48% of total world desalination capacity as compared to 36% produced by the reverse osmosis (RO) process. The rest (16%) is produced by a variety of processes, primarily electrodialysis (ED), multiple effect distillation (MED) and vapor compression distillation (VCD). Saudi Arabia is the leading user of MSFD and the United States is the largest user of the RO process. MSFD, MED and VCD processes are used exclusively in sea water desalination, while ED is applied in brackish water desalination and pure water preparation. The RO process is applied to both sea water and brackish water feed but in the past its application was primarily in brackish water, drinking water and in pure water preparation. More recently, however, sea water RO (SWRO) desalination has become more common, utilizing relatively large plants of 10–15 million gallon/day (mgd) [39–57 million liter/day (mLd)] plants.

SWRO plants are severely limited by factors such as turbidity (TDS) of the water feed. The feed osmotic pressure increases with the TDS. From the principles of RO the applied pressure is necessarily used to overcome the osmotic pressure and the remaining pressure is the net water driving pressure through the membrane. The lower the osmotic pressure can be made, the greater the net water driving pressure, and therefore the greater the amount of pressure available to drive the permeate water through the membrane, which also produces a higher quantity of product.

Various types of filtration or coagulation-filtration systems have been used for treatment of water and other liquid solutions and suspensions for removal of particulate matter. For removal of fine particles with sizes less than 1 $\mu$m, microfiltration (MF), ultrafiltration (UF), nanofiltration (NF) and hyperfiltration/reverse osmosis (HFRO) membrane filtration are employed. MF is used with particles having sizes in the range of 0.08–2.0 $\mu$m, the UF membrane process is more effective for finer particles having sizes in the range of 0.01–0.2 $\mu$m and of molecular weight (MW) in the range of 10,000 g/mole and above. Both the MF and UF membrane processes are true filtration processes where particle separation is done according to size. Moreover, each of the MF and UF membranes has its own characteristic pore size and separation limits. These filtration processes differ significantly from the RO process which is a differential pressure process for separation of ionic particles with sizes of 0.001 $\mu$m or less and molecular weights of 200 g/mole or less.

The NF membrane process falls in-between the RO and UF separation range, and is suited for the separation of particle sizes in the range of 0.01–0.001 $\mu$m and molecular weights of 200 g/mole and above. Unlike either UF or RO, however, NF acts by two principles: rejection of neutral particles according to size and rejection of ionic matter by electrostatic interaction with a negatively charged membrane; Rautenbach et al., *Desalination*, 77:73–84 (1990). NF has been used in Florida for treatment of hard water to produce water of drinking water standards. NF has also been used for removal of color, turbidly, and dissolved organics from drinking water; Duran et al., *Desalination*, 102:27–34 (1995) and Fu et al., *Desalination*, 102: 47–56 (1995). NF has been used in other applications to treat salt solution and landfill leachate; Linde et al., *Desalination*, 103:223–232 (1995); removal of sulfate from sea water to be injected in off-shore oil well reservoirs; Ikeda et al., *Desalination*, 68:109 (1988); Aksia Serch Baker, *Filtration and Separation* (June, 1997).

It would therefore be of substantial worldwide interest to have available a process which would economically produce a good yield of fresh water from saline water, especially from sea water, and which would effectively deal with the problems mentioned above; i.e., removal of hardness and turbidity from such saline water and the lowering of total dissolved solids.

SUMMARY OF THE INVENTION

I have now invented a process which, by combining two or more substantially different water treatment processes in a manner not heretofore done, desalinates saline water, with particular emphasis on sea water, to produce a very high yield of high quality fresh water, including potable water, at an energy consumption per unit of product equivalent to or better than much less efficient prior art desalination processes. In my process nanofiltration as a first desalination step is synergistically combined with a multistage flash distillation, multieffect distillation, vapor compression distillation or sea water reverse osmosis process to provide an integrated system by which saline water (especially sea water) can be efficiently and economically converted to high quality fresh water in yields which are significantly larger by 70%–80% than the yields available from the prior art processes, alone or in combinations heretofore known or described. Thus, while individual steps have been separately known and such steps have individually been disclosed in combination with other processes for different purposes, the present process has not previously been known to or considered by those skilled in the art, and nothing in the prior art has suggested the surprising and unique magnitude of improvement in saline water desalination obtained through this process as compared to prior art processes.

Therefore, in a broad embodiment, the invention is of a desalination process which comprises passing saline water containing hardness scale forming ionic species, microorganisms, particulate matter and/or high total dissolved solids through nanofiltration to form a first water product having reduced content of said ionic species, microorganisms or particulate matter and lowering TDS, and thereafter passing said first water product through sea water reverse osmosis, multistage flash distillation, multieffect distillation or vapor compression distillation to form a second water product also having reduced salinity.

In another broad embodiment, the invention involves a desalination process as in claim 1 which comprises passing said saline water containing hardness-generating ionic species, microorganisms or particulate matter through nanofiltration to form a first water product having reduced content of said ionic species, microorganisms or particulate matter, thereafter passing said first water product through sea water reverse osmosis to form a second water product also having reduced salinity and a reject product having increased salinity, and thereafter passing said reject product through multistage flash distillation to produce a third water product having salinity less than that of said reject product.

The process readily and economically yields significant reductions in saline water (especially sea water) properties, and produces good fresh water, including potable water. Typically a process of this invention will produce, with respect to the sea water feed properties, calcium and magnesium cation content reductions on the order of 75%–95%, total salinity reductions on the order of 25%–38%, pH decreases of about 0.4–0.5, and total dissolved solids content (TDS) reductions of about 35%–50%.

BRIEF DESCRIPTION OF THE DRAWINGS

The Figures are graphs or flow diagrams related to the data presented below. More detailed descriptions of the Figures will be found in the discussions of those data.

DETAILED DESCRIPTION AND PREFERRED EMBODIMENTS

The present invention will be best understood by first considering the various components and properties of saline water, and especially of sea water. Typically sea water will have a cation content on the order of 1.2%–1.7%, of which typically some 700–2000 ppm will be "hardness" cations, i.e., calcium and magnesium cations; an anion content on the order of 2.2%–2.8%; a pH on the order of 7.9–8.2; although wider ranges of one or more of these properties may be present, to constitute a total dissolved solids content on the order of 1.0%–5.0%., commonly 3.0%–5.0%. However, it will be recognized that these components and properties vary throughout the world's oceans and seas. For instance, smaller enclosed seas in hot climates will normally have higher salinities (ionic content) than open ocean regions. Likewise, turbidity (reflected by total suspended solids) of a small area of a sea or ocean, such as the area from which a desalination plant would draw its sea water feed, will be dependent upon the local concentration of organisms and particulates, and even within the same area such concentrations can and often do change with weather, climate and/or topographical changes. Typical values are shown in Table 1 below, and illustrate the sea water variation between typical open ocean water and water of an enclosed "gulf" sea (sometimes referred to hereinafter as "ocean water" and "gulf water" respectively). While "ocean water" is often taken as the basis for standard sea water properties, for the purposes of discussion herein, it will also be recognized that the components and properties of the world's oceans and seas are substantially similar everywhere, and that those local variations which do occur are well understood and accommodated by persons skilled in the art. Consequently the invention described herein will be useful in virtually any geographical location, and the description below of operation with respect to gulf water should be considered exemplary only and not limiting.

TABLE 1

Typical Compositions of Gulf Water and Ocean Seawater

| Constituents | Gulf Sea Water | Ocean Sea Water |
| --- | --- | --- |
| Cations (ppm) | | |
| Sodium, $Na^+$ | 13440 | 10780 |
| Potassium $K^+$ | 483 | 388 |
| Calcium, $Ca^{++}$ | 508 | 408 |
| Magnesium, $Mg^{++}$ | 1618 | 1297 |
| Copper, $Cu++$ | 0.004 | — |
| Iron, $Fe+++$ | 0.008 | — |
| Strontium, $Sr++$ | 1 | 1 |
| Boron $B+++$ | 3 | 0 |
| Anions (ppm) | | |
| Chloride, $Cl^-$ | 24090 | 19360 |
| Sulfate, $SO_4^=$ | 3384 | 2702 |
| Bicarbonate, $HCO_3^-$ | 176 | 143 |
| Carbonate, $CO_3^=$ | — | — |
| Bromide, $Br^-$ | 83 | 66 |
| Fluoride, $F^-$ | 1 | 1.3 |
| Silica, $SiO_2$ | 0.09 | — |
| Other Parameters | | |
| Conductivity ($\mu S$) | 62800 | — |
| pH | 8.1 | 8.1 |
| Dissolved Oxygen (ppm) | 7 | 6.6 |
| $CO_2$ | 2.1 | 2 |
| Total Suspended Solids (ppm) | 20 | — |
| Total Dissolved Solids (ppm) | 43800 | 35146 |

Sea water is characterized by having high TDS, a high degree of hardness due to presence of $Ca^{++}$, $Mg^{++}$, $SO_4^=$ and $HCO_3^-$ ions at relatively high concentration, varying degrees of turbidity, the presence of particulate matter, macro and microorganisms and a pH of about 8.2. Many of the problems and their effect on limitations in sea water desalination are related to those sea water qualities.

One of the major problems in which is inherent in all prior art desalination processes is dealing with the high degree of hardness in sea water. Since all desalination processes operate to extract fresh water from saline water, salts and hardness ions are left behind in the brine with the effect that both the brine TDS and hardness concentrations are increased. Because hardness ions are sparingly soluble in sea water it is common for them to precipitate in the form of scale within the desalination equipment, e.g., on tubes, membranes, etc. Depending on the desalination process operating conditions, two types of scale form: an alkaline soft scale principally composed of $CaCO_3$ and $Mg(OH)_2$ and a non-alkaline hard scale principally composed of $CaSO_4$, $CaSO_4 \cdot \frac{1}{2}H_2O$ and $CaSO_4 \cdot 2H_2O$. The formation of the latter form becomes exaggerated at higher temperature, since the $CaSO_4$ solubility decreases as the solution temperature is increased. In the past, operators of MSFD or other thermal desalination plants commonly added acid and/or other antiscaling additives to the feed water, to allow process operation at brine temperatures of 90°–120° C. without scale formation. However, In spite of this, product fresh water recovery as a fraction of product to make-up feed was low, 30% to 35%. For higher operating temperatures, ion exchange was required to remove $SO_4^=$ or $Ca^{++}$ and obtain higher water recovery. Similarly, in SWRO operation antiscaling agents have also been commonly added to prevent membrane or plant scaling, but again water recovery tends to be limited to about 35% or less. In addition, antiscaling agents are normally returned to the marine environment, either as part of the brine discharge or during descaling operations. Such materials are usually contaminants in the marine environment, and as such would be better avoided.

Another problem in sea water desalination is the impurities in sea water feed to the desalination plants. The presence of particulate matter (macroparticles), microorganisms (e.g., bacteria) and macroorganisms (mussels, barnacles, algae) requires their removal from feed to both SWRO and thermal desalination plants. Removal of turbidity and fine particulates (TSS) from feed destined to SWRO plants has been essential but has not been required for the thermal processes. Removal of the chlorine from feed to chlorine sensitive SWRO membranes has also been required.

Figure 1:
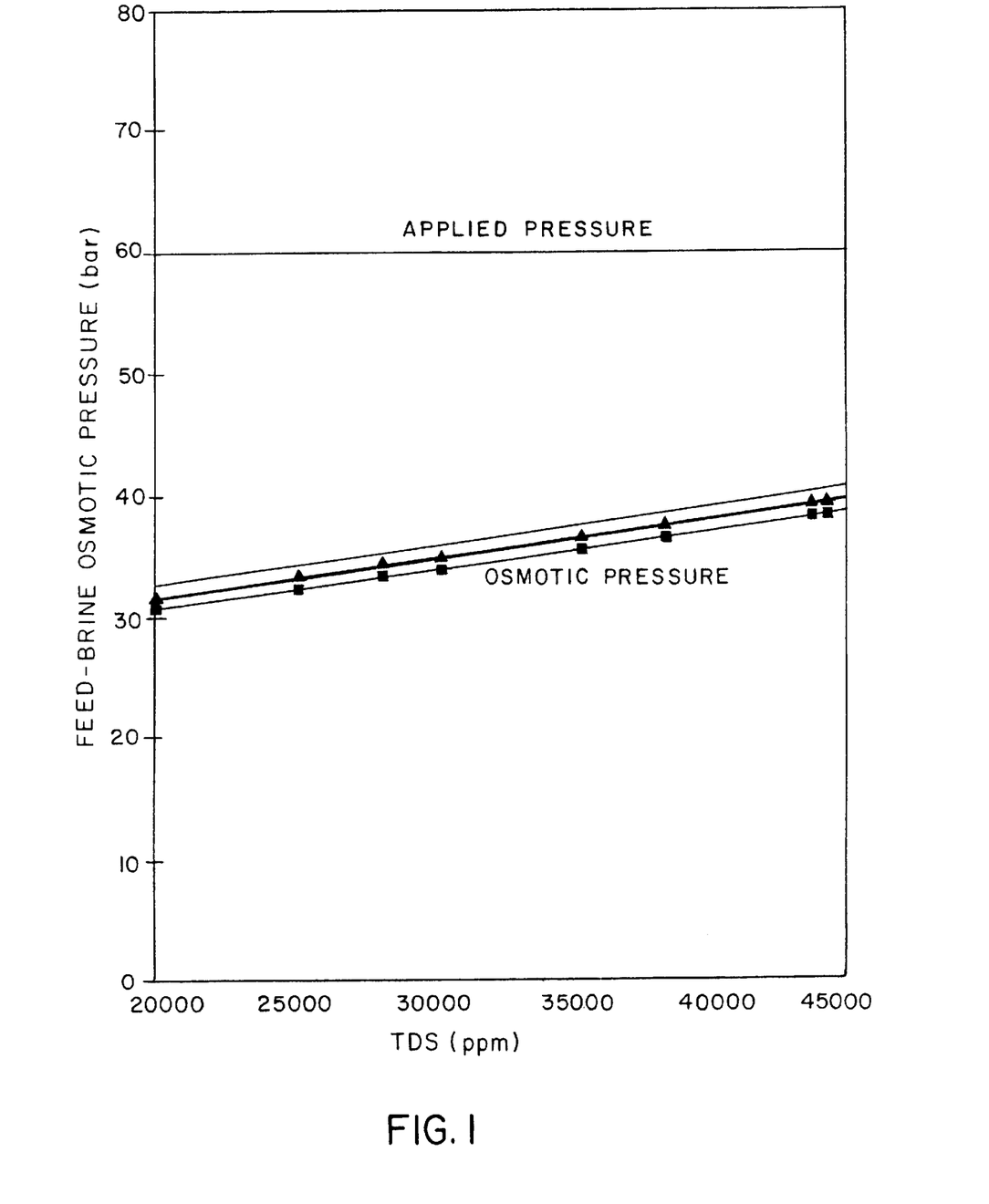
FIG. 1 is a graph showing the effect of sea water feed TDS on osmotic pressure of feed-brine at a constant SWRO brine concentration.

A third problem in sea water desalination, particularly for SWRO processes, is the sea water feed high TDS. The feed osmotic pressure increases as the feed TDS is increased. This either reduces the available net water driving pressure for driving the water through the RO membrane, where the membrane strength limits increases in the applied pressure, or requires a higher applied pressure to maintain the equivalent net water driving pressure. The effect of varying feed TDS on osmotic pressure and net water driving pressure in an SWRO process at a temperature of 25° C. and an applied pressure of 60 bar and final brine TDS of 66,615 ppm is shown in FIG. 1. The available useful pressure to drive the water though the membrane marked by the shaded area decreases as the feed TDS increases. Since the permeate flow through the membrane is directly proportional to the net water driving pressure, reduction of feed TDS by the present process not only reduces wasted energy but also increases the fresh water permeation through the membrane. As will be illustrated below, this case of gained energy by lowering TDS of feed is an principal effect obtained by the present process.

These problems in sea water desalination and measures used to alleviate them are summarized in Table 2 along with the quality requirements of feed to SWRO plant and make-up feed to MSF plants as well as to other thermal distillation processes where the feed is taken from an open sea (surface) intake. Also shown in Table 2 are the comparisons with the process of this invention, from which it will be seen that the present process represents a marked improvement in all aspects of desalination.

TABLE 2

Pretreatment and Quality Requirements of Feed Taken from an Open Sea (Surface) Intake

| Seawater Characteristics | SWRO | Thermal |
| --- | --- | --- |
| High turbidity (TSS, bacteria, etc.) | Requires complete removal | Partial removal |

TABLE 2-continued

Pretreatment and Quality Requirements of Feed Taken from an Open Sea (Surface) Intake

| Seawater Characteristics | SWRO | Thermal |
|---|---|---|
| High degree of hardness of ($Ca^{++}$, $Mg^{++}$, $SO_4^-$, $HCO_3^-$) | Requires: Removal or Inhibition of precipitation and Operation at correct condition | Requires: Removal or Inhibit precipitation by adding antiscalant Removal of hardness allows for an increase in water recover Operation at correct conditions |
| High TDS | Lowering of TDS Lowers waste due to osmotic pressure Increase recovery ratio Lower energy /m³ Lower cost /m³ | Lowering of TDS beneficial but is not necessary |

The present process significantly reduces hardness, lowers TDS in the membrane steps, and removes turbidity from the feed, lowering of energy and chemical consumption, increasing water recovery and lowering the cost of fresh Water production from sea water. This is achieved by the unique combination of NF with SWRO, MSFD, MED or VCD, which can be further enhanced by additional combination with media filtration without coagulation or using a subsurface intake such as beach wells for collection of the sea water.

Nanofiltration, SWRO, MSFD, MED and VCD have all been described extensively in the literature and commercial installations of each exits. Therefore detailed descriptions of each step, the equipment and materials used therein and the various operating parameters need not be given here. As typical examples of comprehensive descriptions in the literature, reference is made to Kirk-Othmer, ENCYCLOPEDIA OF CHEMICAL TECHNOLOGY, 21:327–328 (4th Edn.: 1991) for nanofiltration; ibid, pp. 303–327, for SWRO; and McKetta et al., ENCYCLOPEDIA OF CHEMICAL PROCESSING AND DESIGN, 16:198–224 (1982) for MSFD, MED and VCD. See also Linde et al, supra, and references cited therein for NF and Corbitt, STANDARD HANDBOOK OF ENVIRONMENTAL ENGINEERING, 5-146 to 5-151 for RO and 5-161 to 5-163 for MSFD (1990).

Figure 9:
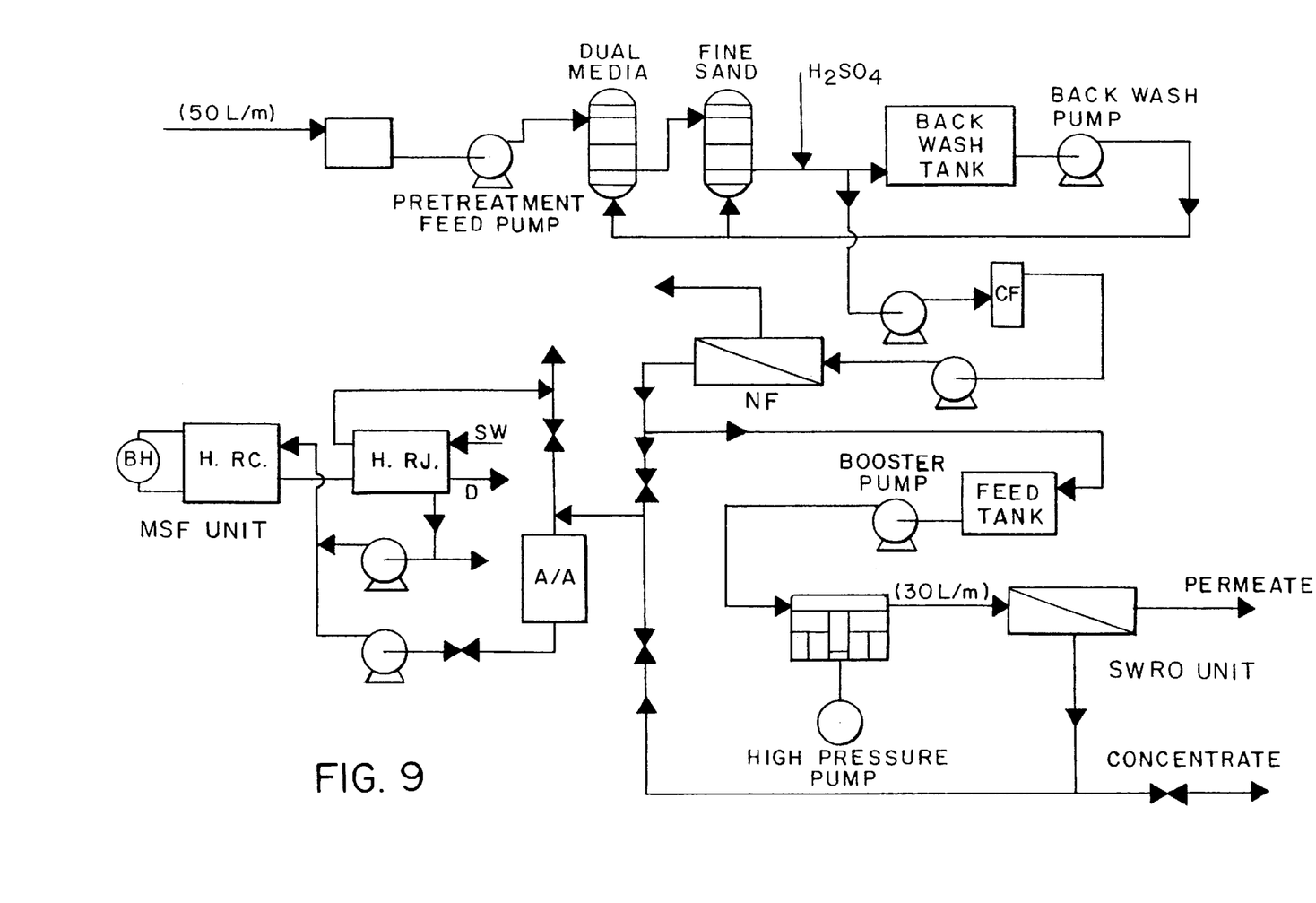
FIG. 9 is a schematic flow diagram of a plant utilizing the process of this invention, with an NF unit as a first desalination step feeding SWRO and MSFD as the second desalination steps, also showing SWRO reject as feed to the MSFD step.

With the basic concepts of NF, SWRO, MSFD, MED and VCD well described and understood, the details of the steps of the present invention can be best understood by reference to the experimental work, which was done on a pilot plant scale. A schematic flow diagram of a NF-SWRO process is given in FIG. 2. (A typical projected commercial operation utilizing either or both SWRO and MSFD is represented in FIG. 9.) The process consists of seawater supply system, dual media filter followed by a fine sandfilter, 5 micron cartridge filter, feed tank, the NF unit and the SWRO unit. The particle size of sand in the sand filter may vary, and is normally on the order of 0.3–1.0 mm.

Figure 2:
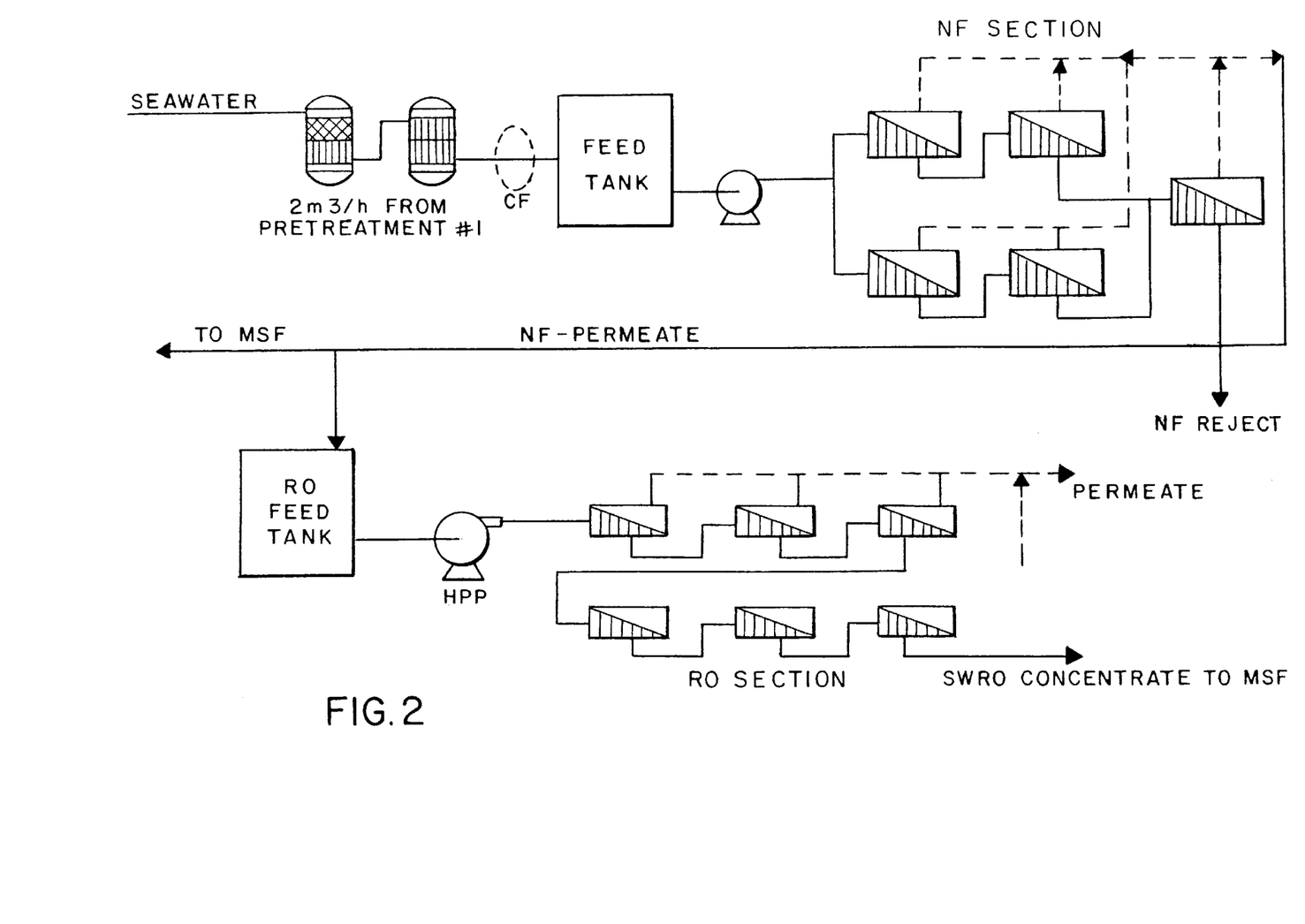
FIG. 2 is a schematic flow diagram of an NF-SWRO desalination plant of the present invention.

The NF unit consists of the high pressure pump to provide up to 20 bar pressure and NF modules each containing two membrane elements. NF membranes may be spiral wound, hollow fine fiber, tubular or plate configuration, although nearly all commercial NF membranes are film composite types and are made of noncellulosic polymers with a spiral wound configuration. The polymer is normally a hydrophobic type incorporating a negatively charged groups, as described for instance in Raman et al., Chem. Eng. Progress, 7(1):58 (1988). The arrangement of the modules is as shown in FIG. 2 where the feed is supplied at ambient sea water temperature to the first two modules arranged in parallel and the reject of each is fed to its following module to which it is connected in series. Reject from the latter two modules constitutes the feed for the final fifth module.

The SWRO unit consists of a high pressure pump capable of delivering up to 70 bar pressure (although higher membrane pressure up to 80 bar can be used), followed by six SWRO modules, each of which contains one spiral wound membrane element, all arranged in series as shown in the Figure.

After initial filtration without coagulation the filtered seawater at ambient temperature is passed to the NF membrane under pressure of about 18 bar. This followed by passing the NF product from the NF unit, also at ambient temperature, to the SWRO unit where it is separated under pressure of 56 to 60 bar into product permeate and reject. This process required no chemicals to be added as coagulants or as antiscaling agents. The chlorine when present in the feed can be removed prior to the NF unit by conventional use of sodium bisulfite.

In various alternative operations, both the NF-SWRO units were operated continuously maintaining constant operation conditions for the NF unit or the SWRO unit was operated under constant operation conditions except for varying the pressure from 56–70 bar, so that the pressure effect on product water recovery could be determined.

The experimental work was done using Persian Gulf sea water, and, as will be discussed below, was compared to the operation of a prior art commercial SWRO sea water desalination plant in Saudi Arabia (hereinafter referred to as "Plant A"), which also uses a Persian Gulf sea water feed. Table 3 below lists the concentration of the various seawater ions in Persian Gulf seawater before and after the NF step along with amount of salt rejection. The NF trial was first made for experimental reasons using one NF module with two elements. The continuous run illustrated in FIGS. 3 and 4 and thereafter was done using a five module unit with two membrane elements per module.

TABLE 3

Chemical Composition and Physical Properties of
Sea Water NF Filtrate and NF Salt Rejection

| Element/ Parameter | Seawater Ion Conc. | NF Filtrate* (1 module) | | NF Filter (5 modules) | |
|---|---|---|---|---|---|
| | | Ion Conc. | Rejection % | Ion Conc. | Rejection % |
| Hardness | | | | | |
| $Ca^{++}$ (ppm) | 481 | 63 | 87 | 93 | 80.7 |
| $Mg^{++}$ (ppm) | 1608 | 105 | 92 | 193 | 87.7 |
| Total Hardness (ppm) | 7800 | 585 | 93.5 | 1049 | 86.5 |
| $SO_4^=$ (ppm) | 3200 | 55 | 98 | 206 | 93.3 |
| $HCO_3^-$ (ppm) | 128 | 37 | 71 | 46 | 63.3 |
| Other Ions | | | | | |
| $Cl^-$ (ppm) | 22780 | 14598 | 36 | 16,692 | 26.7 |
| $Na^+$ (ppm) | (12860) | (8230) | 36 | (94261) | 26.7 |
| Dissolved Solids | | | | | |
| TDS (ppm) | 44046 | 24586 | 44 | 27,720 | 37.3 |
| pH | 8.2 | 7.75 | | 7.85 | |
| Conductivity ($\mu$s/cm) | 60,000 | 37050 | | 40,470 | |

*Each module contains 2 NF elements.

It will be seen from this Table that, with respect to said sea water properties, calcium, magnesium, sulfate and bicarbonate ion content is reduced on the order of 63%–94%, pH is decreased by about 0.4–0.5 units and total dissolved solids content is reduced by about 35%–50%.

The concentration of the hardness ions of $Ca^{++}$, $Mg^{++}$, $SO_4^=$ and $HCO_3^-$ in NF permeate when using one NF module is 63 ppm, 105 ppm, 55 ppm and 37 ppm, respectively as compared to their concentration in seawater of: 481 ppm, 1608 ppm 3200 ppm and 128 ppm. The rejections of those ions $Ca^{++}$, $Mg^{++}$, $SO_4^=$ and $HCO_3^-$ from the feed was 87%, 92%, 98% and 71%, respectively. When the seawater feed is passed through five NF modules the average ion concentrations of $Ca^{++}$, $Mg^{++}$, $SO_4^=$ and $HCO_3^{31\ were}$ 93 ppm, 193 ppm, 206 ppm and 46 ppm, respectively, while average salt rejection was 80.7%, 87.7% 93.3% and. 63.3%. Total hardness was reduced by 86.5%. In addition, chloride ion is also reduced from 22,780 ppm in seawater feed to an average of abut 16,692 ppm in NF permeate or a reduction of about 26.7%. Similar reduction occurs for $Na^+$ and $K^+$ ions. The net effect of this reduction by the NF step in $Cl^-$, $Na^+$ and $K^+$ ions together with the reduction in hardness ions causes reduction in TDS from 44,046 ppm in seawater to an average of 27,782 ppm for the NF pretreated feed, for a reduction of 37.3%. The pH of the feed of 8.2 is also reduced to an average of 7.85 in the NF permeate.

Because of the significant reduction in hardness and the consequent reduction or elimination of scaling, it is usually no longer necessary to add antiscaling chemicals to the feed to the RO step or to pass such chemicals into the RO equipment where, in prior art systems, scaling would occur. This of course is a significant advantage from an environmental standpoint, since such chemicals, and the scale they dissolved, are no longer discharged into the marine environment or deposited in land-based sludge or water reservoirs.

Figure 3:
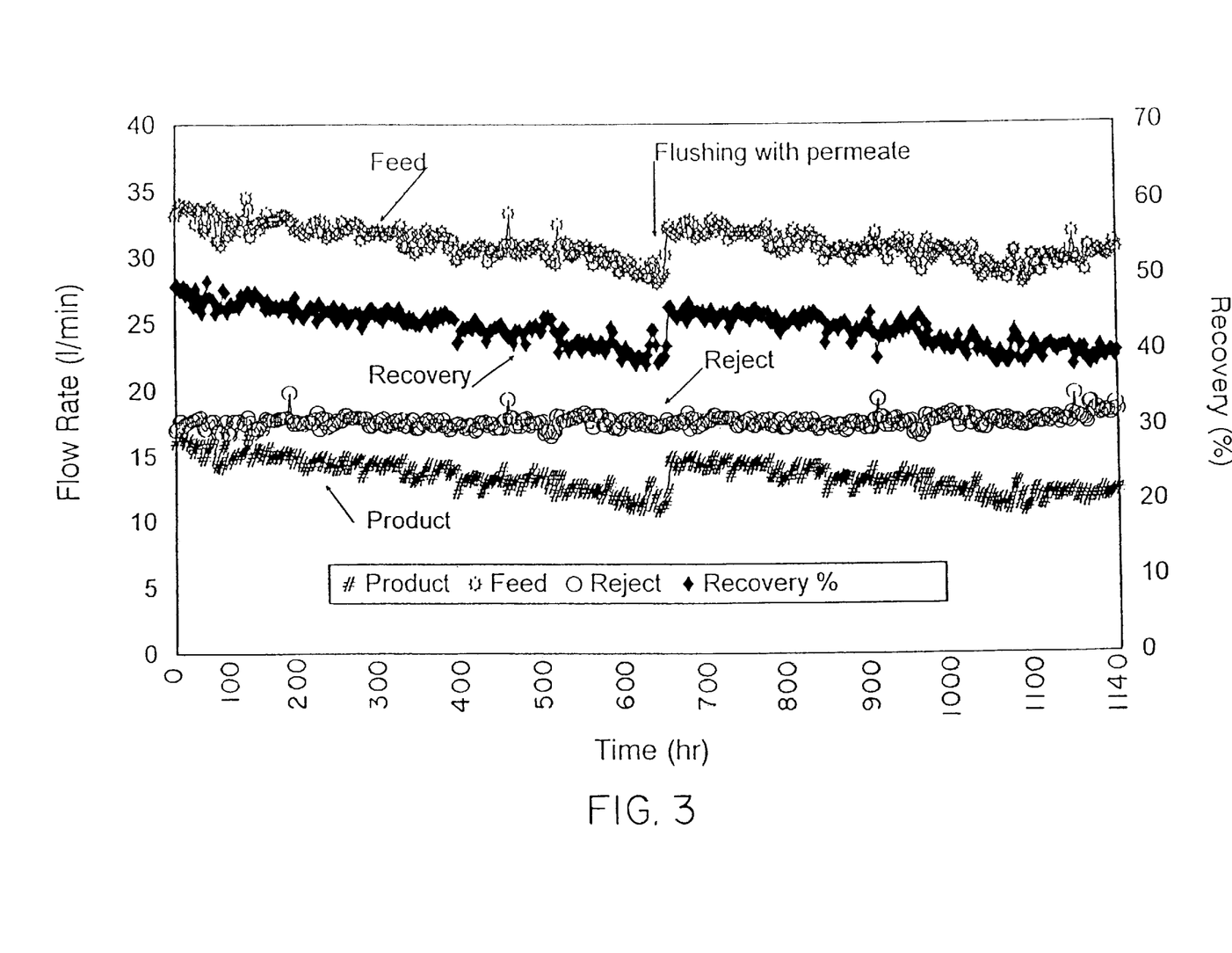
FIG. 3 is a graph showing the time relation between NF water flow rate for feed, reject and product recovery during process operation.
Figure 4:
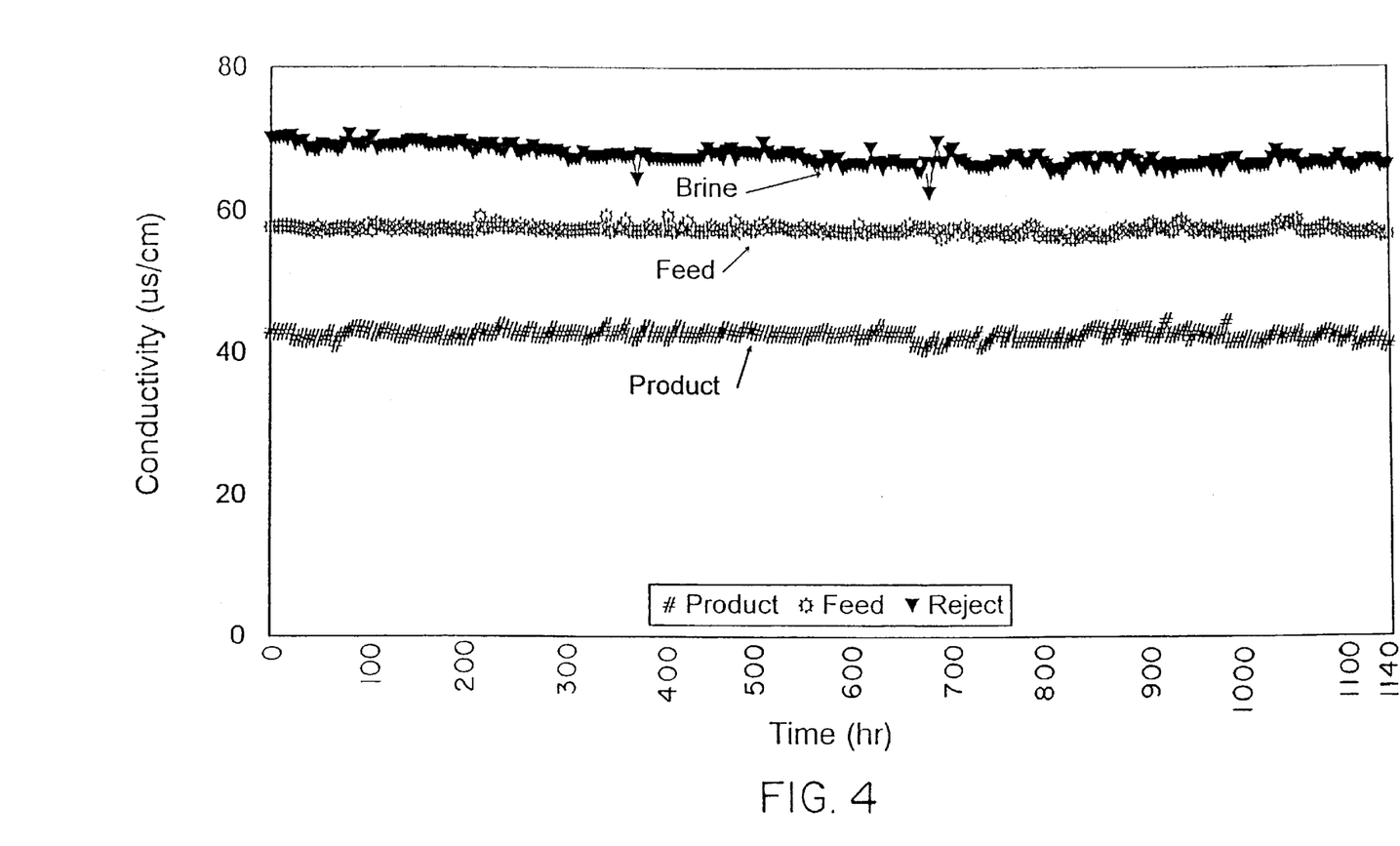
FIG. 4 is a graph showing the time relation of water conductivity of feed, reject and product during NF process continuous operation.

The NF flow of feed, permeate and reject along with product recovery are plotted vs operation time in FIG. 3, while FIG. 4 shows the NF product, feed and reject conductivity plotted vs operation time. Product conductivity remains steady at about 42,000 $\mu$s/cm while product water recovery, depending on feed was over 45%. Product water flow fluctuated at about 15 l/m with some slight decline with operation time. The differential pressure across the NF membrane was steady less than 25 psi and tended to rise after filter backwashing but dropped back to 25 psi with time. Simple rinsing with SWRO permeate reduced the ΔP to about 20 psi. No attempt was made, however, to raise the NF-filtrate recovery ratio although it is anticipated that recovery of 60% or higher can be obtained by lowering the feed pH to about 7.0.

Figure 5:
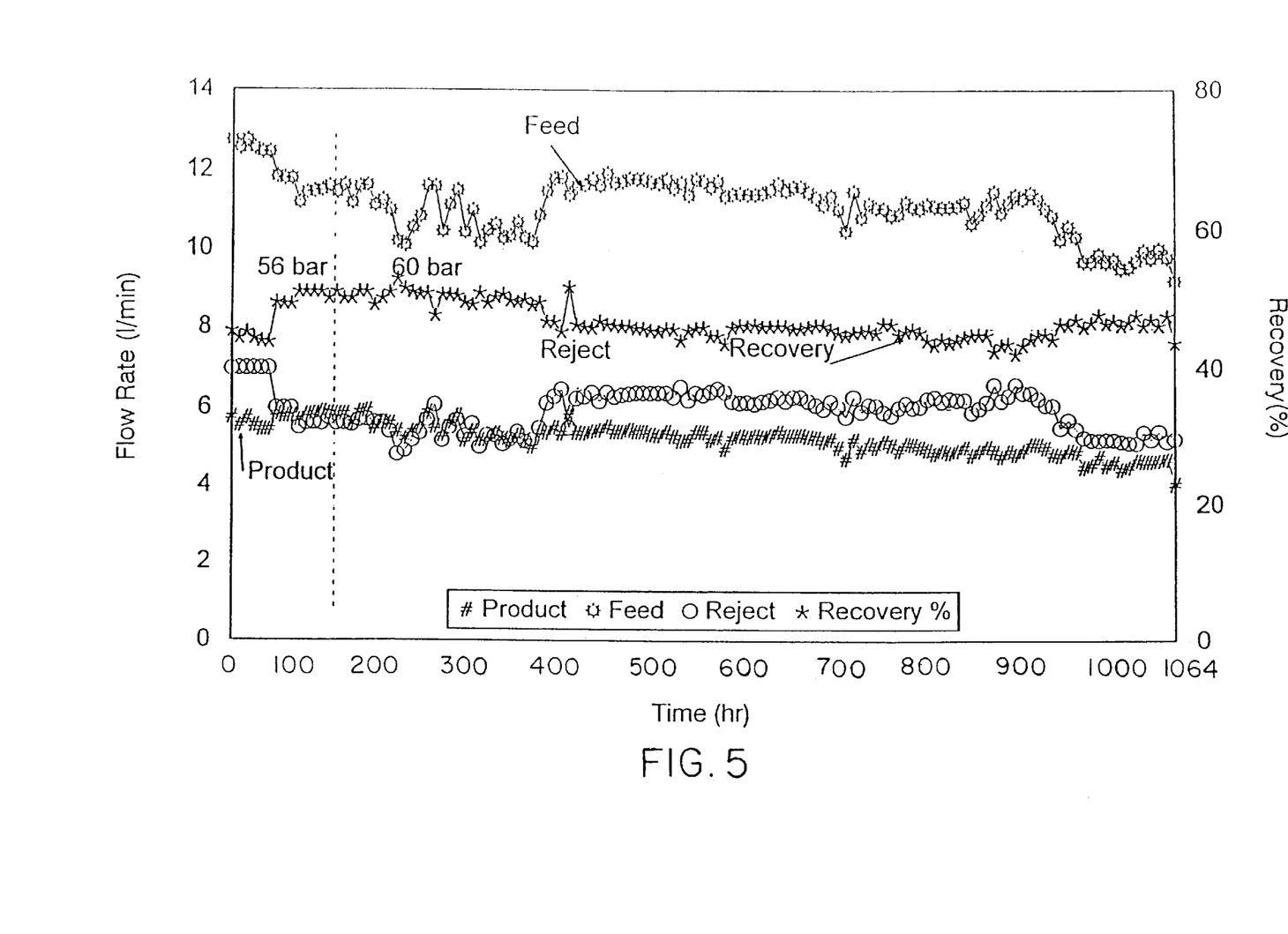
FIG. 5 is a graph similar to FIG. 3 but for SWRO including a change in applied pressure.
Figure 6:
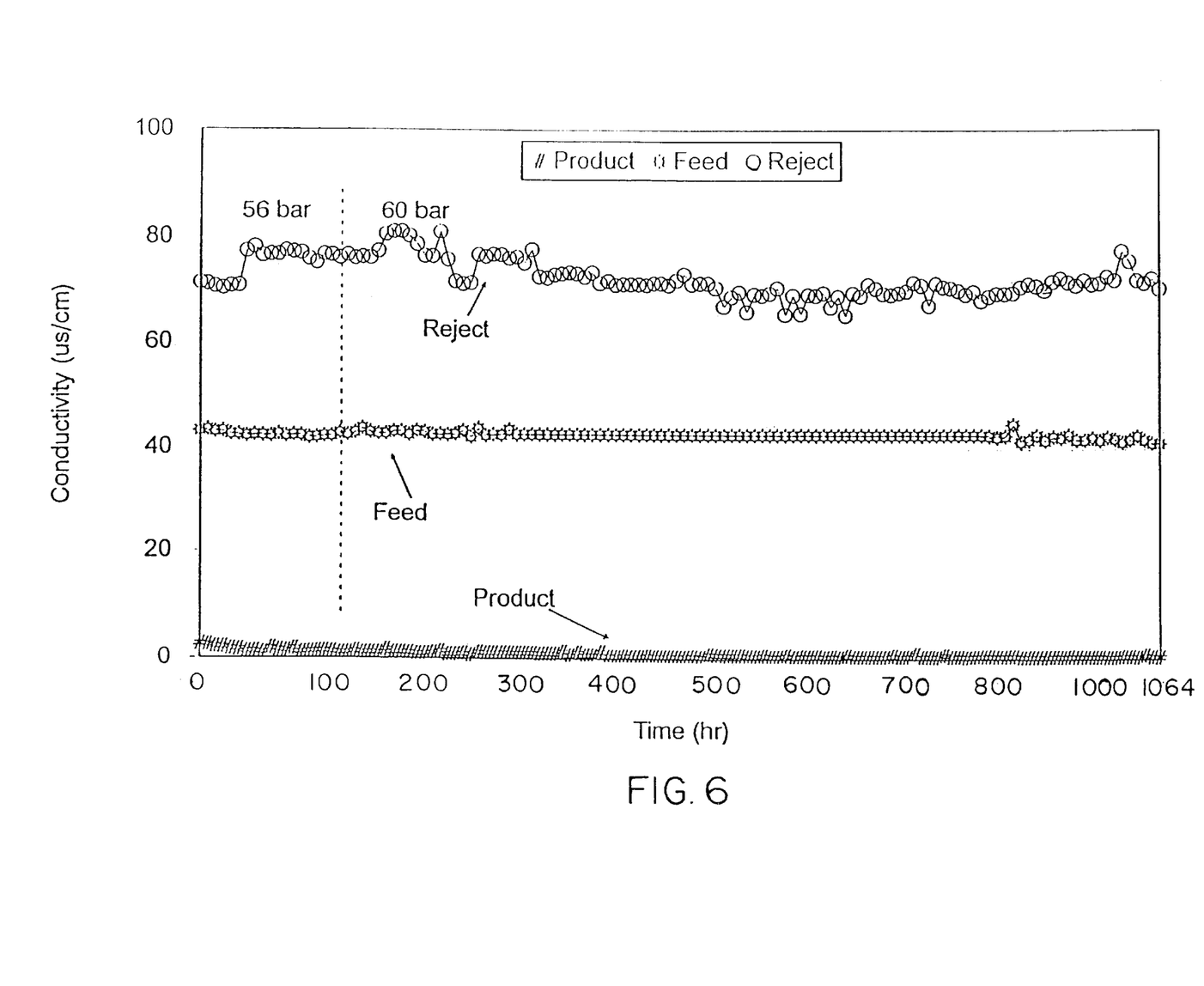
FIG. 6 is a graph similar to FIG. 4 but for SWRO including a change in applied pressure.
Figure 7:
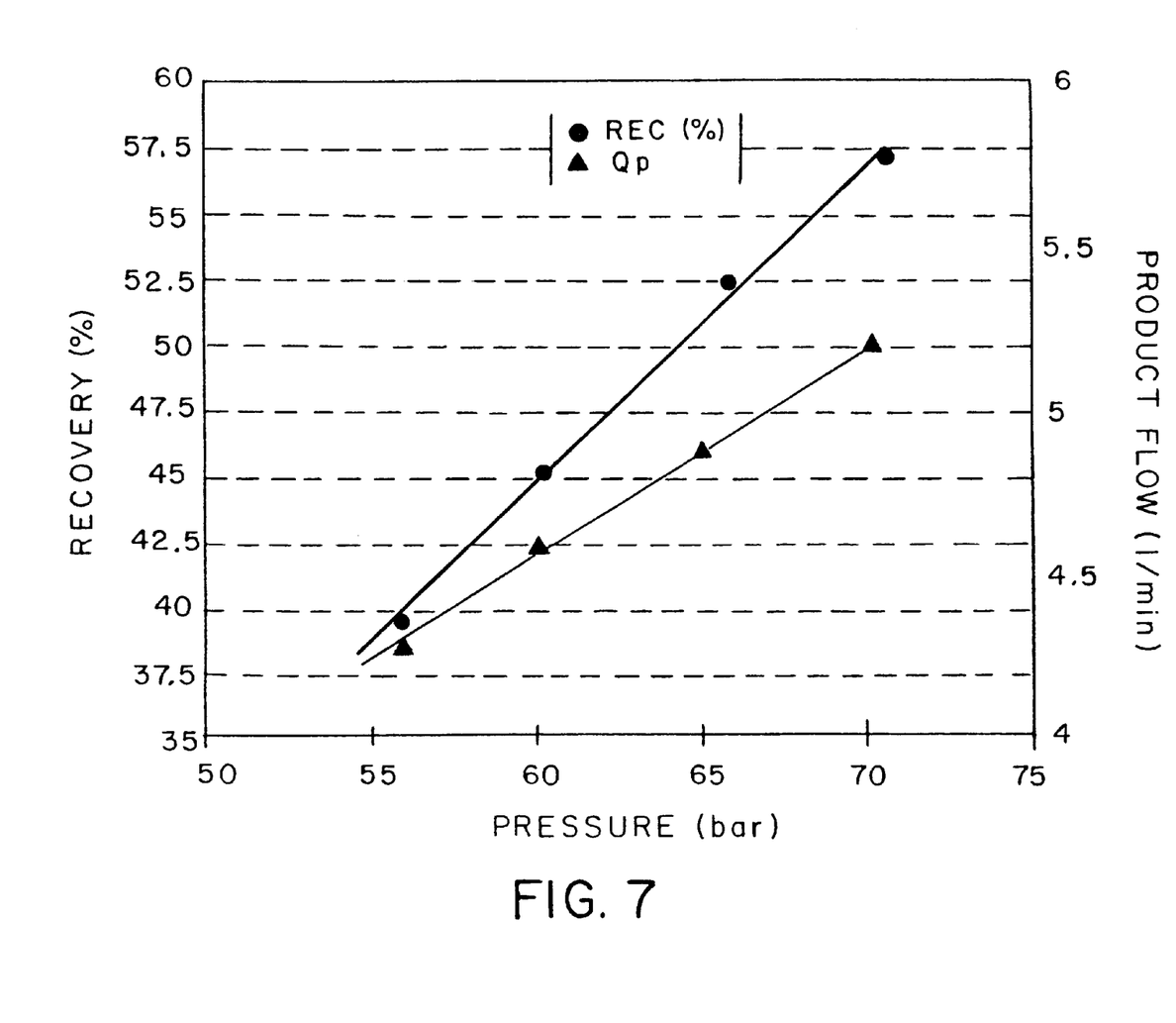
FIG. 7 is a graph showing the effect of increasing applied pressure on a membrane on product water flow and product recovery from the SWRO unit in an NF-SWRO process of this invention.

Passage of the NF permeate at TDS ≈27,300 ppm to the SWRO step under pressure of 60 bar resulted in a steady ΔP, constant at 2 bars during the entire operation. The SWRO permeate, feed, reject flow and product recovery are plotted vs operation time in FIG. 5, while FIG. 6 is a plot of the conductivity of permeate, reject and feed vs operation time. The permeate flow and hence product recovery increased with pressure from about 45.5% at an applied pressure of 60 bar to an amazing 58.43% at 70 bar for an increase of 1.29% in recovery for each increase of one bar in the applied pressure (FIG. 7). As shown in the same Figure the product flow is also increased directly with the applied pressure. This high product recovery can be compared to less than 30% for normally pretreated seawater feed in prior art SWRO processes using the same SWRO plant without the NF pretreatment.

Table 4 shows that the reject from the SWRO step contains a low concentration of hardness ions of 172, 362, 420 and 78 ppm for $Ca^{++}$, $Mg^{++}$, $SO_4^=$ and $HCO_3^-$, respectively. The TDS of reject brine of 51,580 ppm in Table 4 is also low when compared for example to the reject from Plant A of about 66,615 ppm at the applied pressure of about 60 to 65 bar.

TABLE 4

Chemical Composition of Gulf Seawater, NF Permeate, NF Reject and SWRO Reject

| Parameter | Gulf Sea Water | NF Permeate | NF Reject | SWRO Reject |
|---|---|---|---|---|
| Calcium (ppm) | 481 | 94 | 741 | 172 |
| Magnesium (ppm) | 1608 | 201 | 2444 | 362 |
| Sulphate (ppm) | 3200 | 235 | 5600 | 420 |
| $M_{alk}$ as $CaCO_3$ (ppm) | 128 | 47 | 186 | 78 |
| Total Hardness as $CaCO_3$ (ppm) | 7800 | 1060 | 11900 | 1920 |
| Chloride (ppm) | 22780 | 17140 | 27424 | 29995 |
| Total Dissolved Solids (ppm) | 44046 | 28930 | 55590 | 51580 |
| Conductivity (ppm) | 60,000 | 41800 | 62600 | 69100 |
| pH | 8.2 | 7.91 | 7.98 | 7.78 |

Figure 8:
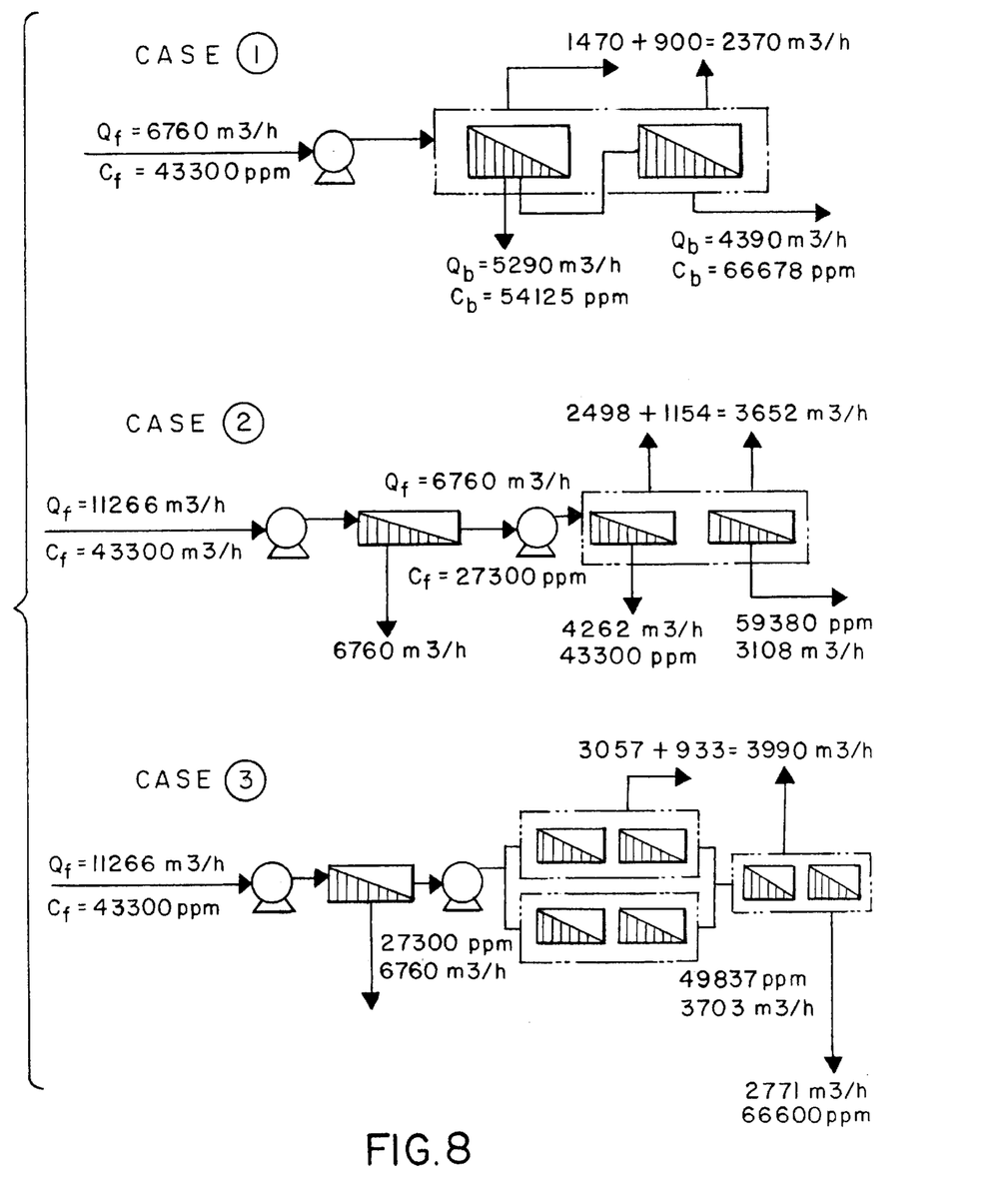
FIG. 8 is a graphical comparison of the process of this invention with a SWRO process located on the Red Sea.

To further illustrate the advantages of the present process a simulation was conducted in which the operating parameters of Plant A were examined for the effect of integrating an NF step with the existing SWRO system. FIG. 5 shows the result, which projects higher recovery about 46% at 60 bar can be achieved from the "modified" Plant A. SWRO when the SWRO is combined with NF unit. Further improvement of more than 35% can is projected if Plant A is modified to operate with an NF pretreatment in a combined NF-SWRO system. This is illustrated in FIG. 8 which is a schematic flow diagram of the desalination part of Plant A in its present SWRO form and as modified for a combined NF-SWRO process of the present invention. Part ① represents the actual Plant A feed, product and reject flows along with the product water recovery ratio, the brine flow/modules and the energy required for the desalination part alone. Energy was calculated from the equation:

$$\text{Energy (KWH/m}^3) = [Q_f H_f \rho / 366 \, Q_{pp} e]$$

where $Q_f$ and $Q_p$ are the quantity of feed and product in $m^3$/hr, respectively; H is the pressure head in meters; $\rho$ is the specific gravity of seawater (1.03); and e is the pump efficiency (≈0.85).

Parts ② and ③ show respectively the results of the simulated operation of the "modified" Plant A in a combined NF-SWRO system utilizing the present SWRO desalination operation as it is now and the same with reject staging. Plant A receives Persian Gulf sea water feed with a TDS of 43,300 ppm from a conventional coagulation filtration unit at the rate of 6760 $m^3$/hr and produces at an applied pressure of 60 bar 2370 $m^3$/hr of fresh water for a product recovery of 35%. The total quantity of reject is 4390 $m^3$/hr with TDS of about 66,615 ppm. The product and reject flow per module/hour is 1.6 $m^3$/hr and 2.97 $m^3$/hr, respectively. The energy requirement for the SWRO desalination part alone is 6.61 KWH/$Mr^3$ of product.

Each of the hollow fine fiber membrane modules used at Plant A contains two SWRO membrane elements arranged in series with brine staging where the feed is first passed to the first set of elements and the remaining feed after extraction of a fraction of it as product is passed to the second set of elements which in turn extracts a second fraction of product (Part ① of FIG. 8). Overall product yield at Plant A in its current operations has been observed as about 35%. Using the same operational data it is possible to establish the potential performance of Plant A when if modified to run the combination process of the present invention, which as noted is shown in parts ② and ③ of FIG. 8. Again, the product flow, recovery were calculated based on the effect of the change in osmotic pressure on reducing the applied pressure to the net water driving pressure as a function of molar ionic concentration at different TDS concentrations in the feed and reject. As in the previous case ① the SWRO desalination is assumed to occur in two steps. In case ② of FIG. 8, the first set of elements is assumed to treat the NF feed to yield reject with the same TDS as in actual feed to SWRO Plant A, which constitutes the feed to the second stage elements. The second stage set of elements allow for extraction of product from this feed to yield recovery of about 37% compared to a product recovery of 27% of the feed to the second step. The overall recovery is about 54%. Operation to produce a higher brine concentration will produce a higher recovery of about 60%. Minimum brine flow through the module can be maintained either by increasing the seawater feed flow and raising the applied pressure by a few bars or by the use of a second stage SWRO in brine staging process with module ratio of 2:1 for first to second stage, and in case ③ of FIG. 8. In this latter arrangement, the combined NF-SWRO product recovery is 59%, while brine reject per module is 3.5 $m^3$/hr, satisfying the requirement of minimum brine flow rate of 2.0 $m^3$/hr per module. The energy requirement is 5.0 KWH/$m^3$.

Table 5 below gives a summary of the permeate flow, recovery and energy requirements for the three cases shown in FIG. 8. It also compares for each of the three arrangements SWRO with and without NF, the number of modules, number of modules per 1000 $m^3$/hr of product, product water ratio, modules ratio and energy requirement ratio along with final brine flow per module. In all cases the operation with the combined NF-SWRO system is superior to the prior art processes. This is demonstrated in Table 5 below by the various ratios of system performance and its requirement. For the three cases ①, ② and ③ respectively the module requirements are 1:0.65:0.70; water production ratios of 1:1.54:1.69 to product per element of 1.6:2.47:2.8 $m^3$/hr and energy requirement ratios of 1.0:0.81:0.76.

TABLE 5

Summary of Results of SWRO and Combined NF-SWRO

| Parameters | SWRO Alone | NF-SWRO w/out SWRO Modification | NF-SWRO w/ Module Addition |
|---|---|---|---|
| Product Flow (m3/hr) | 2370 | 3652 | 3990 |
| Recovery (%) | 35 | 54 | 59.0 |
| Energy/$m^3$ (KWH/$m^3$) | 6.61 | 5.51 | 5.05 |
| Number of Modules | 1480 | 1480 | 1749 |
| Number of modules per 1000 $m^3$/hr | 624 | 405 | 438 |
| Product water ratio | 1 | 1.54 | 1.69 |
| Modules ratio | 1 | .65 | .70 |
| Product per module ($m^3$/hr) | 1.60 | 2.468 | 2.283 |
| Energy ratio | 1 | 0.81 | 0.76 |
| Final brine flow per module | 2.97 | 2.1 | 4.75 |

The above results obtained in the process of the invention illustrate the synergistic effect of combining an NF step with an SWRO step for removal of hardness, lowering of TDS and pH in the NF permeate which is used as feed to the SW/RO step leading to overall significantly enhanced product water recovery. The combined process can be conducted in a single stage of each step, thus eliminating multistage SWRO requirements with a saving of capital investment and operating and maintenance costs of over 10%, as well as increasing the plant output at least by 15% over multistage SWRO units.

he same results are obtained when the NF step is combined with a MSFD step. Operation of MSFD plants at 135°

C.–150° C. without scale formation has been possible when sulfate in the feed was reduced using ion exchange from 2900 ppm to 1200 ppm. By combining NF and MSFD, however, sulfate ions in Gulf seawater can be reduced from 3200 ppm to less than 210 ppm, as shown in Table 4 above, and additional reductions in levels of sulfate to less than 210 ppm can be expected when sea water from other oceans and seas are used as feed. The NF permeate can thus be used as make-up feed to the MSFD step in a combined NF-MSFD process of the present invention. Projections of operation at TBT of 120° C.–150° C. shows a gain in distillate output.

Further, with a sulfate content in SWRO reject from the NF-SWRO process of less than 400 ppm, a $Ca^{++}$ content less than 175 ppm and a TDS of about 51600 ppm, the processes can be further combined to use the SWRO reject as make-up to an MSFD step in a NF-SWRO-MSFD embodiment of the process.

A summary of broad and preferred ranges of operating conditions for the various units alone and in combination in the present invention is presented in Table 6 below. Also illustrated below in Table 7 is a summary of the effect of variation of top brine temperature on performance ratios and energy consumption in an MSFD step.

TABLE 6

Summary of Operating Conditions

| SYSTEM | Temperature, °C. | | Pressure, Bar | | Power[a] kWh/ $m^3$ | Steam[b] kg/kgp[c] |
|---|---|---|---|---|---|---|
| | Range | Pref'd. | Range | Pref'd. | | |
| NF | 15–40 | 28–32 | 15–25 | 14–18 | 1 | — |
| SWRO-NF[d] | 15–40 | 28–32 | 50–83 | 60–70 | 4–5 | — |
| SWRO alone | 15–40 | 28–32 | 56–83 | 60–70 | 6.6[e] | — |
| MSFD | 90–150 | 112–113 | — | — | 3.7 | 1:8 |
| MSF-NF[f] | 120–150 | 120–130 | — | — | 3.7 | — |

Notes:
[a]Electric power
[b]Steam requirements depend on water recovery rate
[c]kg of steam per kg of water product
[d]Values are for SWRO unit only
[e]Power required to circulate brine and feed, plus any other pumping operations
[f]Values are for MSFD unit only

TABLE 7

Effect of Top Brine Temperature (Tbt) on Performance Ratios and Energy Consumption

| Operating TBT, °C. | 90.6 | 112.8 | 120[a] | 130[a] | 135[a] | 140[a] | 150[a] |
|---|---|---|---|---|---|---|---|
| Performance Ratio (kg/1000 kJ) | 3.44 | 4.08 | 4.34 | 4.77 | 5.01 | 5.28 | 5.93 |
| Energy (kJ/kg product) | 290.7 | 245.1 | 230.3 | 209.8 | 199.5 | 189.2 | 168.7 |
| Product Ratio | 1.00 | 1.19 | 1.26 | 1.39 | 1.46 | 1.53 | 1.72 |
| Energy Ratio | 1.00 | 0.84 | 0.79 | 0.72 | 0.69 | 0.65 | 0.58 |

[a]Values for all temperature $\geq 120°$ C. are calculated based on the operational and design data for 90.6° C. and 112.8° C.

It will be seen from Table 7 that the energy saving per ° C. is 2.05 kJ, and the increase in product is 0.029 kg. It should be noted that for both MED and VCD the preferred operating temperatures and temperature range are less than those for MSFD. Also, it has been found that operation at 120° C. using MSFD with 2 or 4 stages of heat rejection and heat recovery permits a significantly higher throughput and therefore higher product output.

The economic improvement provided by this process can be seen by consideration of a study done comparing the current capital, operating and product costs of three existing SWRO desalination plants on the Red Sea with the actual equivalent costs if the plants were converted to an NF-SWRO process of the present invention. This comparison took into account the actual cost of power and chemical consumption, the costs of spare parts, membrane replacement, micron cartridge filters, other consumables and operations and maintenance, including labor, as well as plant availability of 90%. For comparison purposes the current operations were normalized to a fresh water product output of about 18.7 million $m^3$/day (4.9 billion gals/day). Similarly, the modified plants were normalized to a product yield of about 32.0 million $m^3$/day (8.4 billion gals/day). The normalized cost of product for the three current plants was $1.26, $1.51 and $1.53 per $m^3$ of product, respectively (0.48¢, 0.57¢ and 0.58¢, respectively). For the modified plants, dramatic reductions to $0.89, $1.06 and $1.07 per $m^3$ of product (0.34¢, 0.40¢ and 0.41¢ per gal), respectively, would be achieved. This represents a 40%–42% decrease in per unit product cost matched with a 70% increase in product yield. Clearly this provides a substantial enhancement of the potential for economical desalination plant operation throughout the world.

It will be evident that there are numerous embodiments of this invention which, while not expressly set forth above, are clearly within the scope and spirit of the invention. The above description is therefore to be considered to be exemplary only, and the actual scope of the invention is to be determined solely from the appended claims.

I claim:

1. A desalination process which comprises passing sea water containing a high content of hardness scale forming ionic species, microorganisms or particulate matter or total dissolved solids through a membrane nanofiltration unit to form a first water product having a reduced content of said ionic species, microorganisms, particulate matter or total dissolved solids, and thereafter passing said first water product through a thermal distillation unit to form a second water product of potable quality without salt production.

2. A desalination process as in claim 1 wherein said first water product is passed through at least one of multistage flash distillation, multieffect distillation or vapor compression distillation to form said second water product.

3. A desalination process as in claim 1 wherein said sea water has a cation content on the order of 1.2%–1.7%, an anion content on the order of 2.2%–2.8%, a pH on the order of 7.9–8.2, comparable to a total dissolved solids content on the order of 3.0%–5.0%.

4. A desalination process as in claim 3 further comprising said cation content including 700–2200 ppm of calcium and magnesium cations.

5. A desalination process as in claim 4 wherein, with respect to said sea water properties, calcium, magnesium, sulfate and bicarbonate ion content is reduced on the order of 63%–94%, pH is decreased by about 0.4–0.5 units and total dissolved solids content is reduced by about 35%–50%.

6. A desalination process as in claim 1 wherein said nanofiltration unit is operated at a temperature on the order of 15°–40° C. and a pressure on the order of 15–25 bar.

7. A desalination process as in claim 1 wherein said sea water reverse osmosis unit is operated at a temperature on the order of 15°–40° C. and a pressure on the order of 15–25 bar.

8. A desalination process as in claim 1 wherein said multistage distillation, multieffect distillation or vapor compression distillation unit is operated at a temperature on the order of up to about 120°–130° C.

9. A desalination process as in claim 1 wherein said first water product is divided into a first portion and a second portion, said first portion thereafter being passed through a thermal distillation unit to form a second water product of potable quality without salt production and said second portion thereafter being passed through a sea water reverse osmosis unit to form a second water product of potable quality and a reject water product having increased salinity and reduced hardness, and thereafter passing said reject water product through a thermal distillation unit to form a third water product of potable quality without salt production.

10. A desalination process as in claim 9 wherein said sea water has a cation content on the order of 1.2%–1.7%, an anion content on the order of 2.2%–2.8%, a pH on the order of 7.9–8.2, comparable to a total dissolved solids content on the order of 3.0%–5.0%.

11. A desalination process as in claim 10 further comprising said cation content including 700–2200 ppm of calcium and magnesium cations.

12. A desalination process as in claim 9 wherein said nanofiltration unit is operated at a temperature on the order of 15°–40° C. and a pressure on the order of 15–25 bar.

13. A desalination process as in claim 9 wherein said sea water reverse osmosis unit is operated at a temperature on the order of 15°–40° C. and a pressure on the order of 15–25 bar.

14. A desalination process as in claim 9 wherein said multistage distillation, multieffect distillation or vapor compression distillation unit is operated at a temperature on the order of up to about 120°–130° C.

15. A desalination process as in claim 9 wherein said thermal distillation unit comprises a multistage flash distillation unit, a multieffect distillation unit or a vapor compression distillation unit.

* * * * *